(12) United States Patent
Ohno et al.

(10) Patent No.: US 8,664,438 B2
(45) Date of Patent: Mar. 4, 2014

(54) PROCESS FOR PRODUCING CARBONYL DIFLUORIDE

(75) Inventors: Hiromoto Ohno, Minato-ku (JP); Toshio Ohi, Minato-ku (JP); Hidejiro Yokoo, Minato-ku (JP)

(73) Assignee: Showa Denko K.K., Tokyo (JP)

( * ) Notice: Subject to any disclaimer, the term of this patent is extended or adjusted under 35 U.S.C. 154(b) by 324 days.

(21) Appl. No.: 13/122,621

(22) PCT Filed: Oct. 2, 2009

(86) PCT No.: PCT/JP2009/067236
§ 371 (c)(1),
(2), (4) Date: Apr. 5, 2011

(87) PCT Pub. No.: WO2010/041601
PCT Pub. Date: Apr. 15, 2010

(65) Prior Publication Data
US 2011/0184209 A1 Jul. 28, 2011

(30) Foreign Application Priority Data
Oct. 6, 2008 (JP) .................. 2008-259776

(51) Int. Cl.
*C07C 51/58* (2006.01)
*C09K 3/00* (2006.01)
*B01D 11/04* (2006.01)

(52) U.S. Cl.
USPC ....... 562/852; 252/182.12; 210/511; 210/634

(58) Field of Classification Search
None
See application file for complete search history.

(56) References Cited

U.S. PATENT DOCUMENTS

| | | | | |
|---|---|---|---|---|
| 2,836,622 A | * | 5/1958 | Tullock | 562/852 |
| 2,838,512 A | * | 6/1958 | Teysseire | 544/191 |
| 3,253,029 A | * | 5/1966 | Fawcett | 562/849 |
| 4,260,561 A | | 4/1981 | Franz | |
| 5,444,171 A | * | 8/1995 | Ohno et al. | 570/177 |
| 6,458,249 B2 | * | 10/2002 | Miller et al. | 203/51 |
| 7,371,898 B2 | | 5/2008 | Mitsui | |
| 7,417,167 B2 | | 8/2008 | Ohashi et al. | |
| 2002/0065432 A1 | | 5/2002 | Eckert et al. | |

FOREIGN PATENT DOCUMENTS

| | | | |
|---|---|---|---|
| JP | 54-158396 A | | 12/1979 |
| JP | 2000-34250 A | | 2/2000 |
| JP | 2002-326001 A | | 11/2002 |
| JP | 2002-348270 A | | 12/2002 |
| JP | 2002-542137 A | | 12/2002 |
| JP | 2003-146620 A | | 5/2003 |
| JP | 2004-262679 | * | 9/2004 |
| JP | 2004-262679 A | | 9/2004 |
| JP | 3707917 B2 | | 10/2005 |
| WO | 2005/056472 A1 | | 6/2005 |
| WO | WO2006030677 | * | 3/2006 |

* cited by examiner

*Primary Examiner* — Johann R Richter
*Assistant Examiner* — Mark Luderer
(74) *Attorney, Agent, or Firm* — Sughrue Mion, PLLC

(57) ABSTRACT

An object of the invention is to provide efficient, simple and inexpensive processes for the production of carbonyl difluoride, which is an attractive and important compound as a semiconductor etching gas or a semiconductor cleaning gas. A process for producing carbonyl difluoride of the invention includes a step of reacting phosgene and hydrogen fluoride in a gas phase in the presence of a fluorination catalyst to produce carbonyl difluoride and hydrogen chloride, and a step of mixing a mixture containing the carbonyl difluoride and the hydrogen chloride with an organic solvent that is azeotropic with hydrogen chloride but zeotropic with carbonyl difluoride, and distilling the resultant mixture to separate the carbonyl difluoride.

14 Claims, No Drawings

PROCESS FOR PRODUCING CARBONYL DIFLUORIDE

TECHNICAL FIELD

The present invention relates to processes for the production of carbonyl difluoride, which is attractive as a semiconductor etching gas or a semiconductor cleaning gas.

BACKGROUND ART

Carbonyl difluoride is an attractive and important compound as a semiconductor etching gas or a semiconductor cleaning gas. For example, known processes for producing carbonyl difluoride are described in the following patent literatures.

(1) WO 05/56472 (Patent Literature 1) discloses a process wherein carbon monoxide and fluorine gas together with hydrogen fluoride or carbonyl difluoride as a diluting gas are continuously supplied to a reaction vessel and are reacted together to produce carbonyl difluoride.

(2) JP-A-2004-262679 (Patent Literature 2) discloses a process for the production of carbonyl difluoride including the following first step and second step:

First step: Phosgene ($COCl_2$) and hydrogen fluoride are reacted to give a mixture of carbonyl difluoride, chlorofluorocarbonyl (COClF) and hydrogen chloride, and the mixture is distilled to remove carbonyl difluoride and hydrogen chloride, thereby obtaining chlorofluorocarbonyl.

Second step: Chlorofluorocarbonyl obtained in the first step is subjected to disproportionation reaction to give a reaction mixture, and phosgene and chlorofluorocarbonyl are removed from the mixture to recover carbonyl difluoride.

(3) Japanese Patent No. 3707917 (Patent Literature 3) discloses a process for producing carbonyl difluoride by reacting carbon dioxide and fluorine gas in a gas phase.

(4) JP-A-2003-146620 (Patent Literature 4) discloses a process of producing carbonyl difluoride by reacting carbon monoxide and a metal fluoride ($MF_x$: M is for example Co (x=2) or Ce (x=4)), wherein a step of reacting carbon monoxide and the metal fluoride, and a step of reacting the metal fluoride and fluorine are alternately repeated in a single reaction vessel.

(5) U.S. Pat. No. 2,836,622 (Patent Literature 5) discloses a process for the preparation of carbonyl difluoride including the following steps:

(i) a step in which phosgene is reacted with hydrogen fluoride at a temperature of at least 50° C. in the presence of, for example, an activated carbon catalyst to give a reaction product containing carbonyl difluoride and hydrogen chloride; and (ii) a step in which the reaction product is brought into contact at temperatures above 0° C. with a stoichiometric amount, based on hydrogen chloride and unreacted hydrogen fluoride in the reaction product, of an inorganic compound (for example an alkali metal fluoride or sulfur trioxide) until substantially all of the hydrogen chloride and the hydrogen fluoride are absorbed.

CITATION LIST

Patent Literatures

Patent Literature 1: WO 05/56472
Patent Literature 2: JP-A-2004-262679
Patent Literature 3: Japanese Patent No. 3707917
Patent Literature 4: JP-A-2003-146620
Patent Literature 5: U.S. Pat. No. 2,836,622

SUMMARY OF INVENTION

Technical Problem

However, the carbonyl difluoride production processes (1) to (5) described above still have the following problems.

In the production process (1), the reaction is carried out at high temperatures and results in tetrafluoromethane as a byproduct. Consequently, separation and purification may be difficult or the yield of carbonyl difluoride may be lowered. Industrial problems thus remain.

The production process (2) involves two steps. This is because the target carbonyl difluoride and byproduct hydrogen chloride have very similar boiling points and cannot be separated by usual distillation. This process thus has industrial problems in terms of difficult separation/purification and low yield of carbonyl difluoride.

The production process (3) also has industrial problems. In detail, because the raw material carbon dioxide and the carbonyl difluoride have very similar boiling points, separation is difficult by usual distillation and the yield of carbonyl difluoride is lowered. Further, the use of expensive fluorine gas adds production costs.

The production process (4) entails alternately repeating a step of reacting carbon monoxide and a metal fluoride and a step of reacting (re-fluorinating) the metal fluoride with fluorine. The process thus causes economic problems such as high facility costs and fluorine loss in the re-fluorination.

In the process (5), hydrogen chloride produced by the reaction of phosgene and hydrogen fluoride, and unreacted hydrogen fluoride are removed by contact with an inorganic compound (for example an alkali metal fluoride or sulfur trioxide). The process involves large amounts of the inorganic compounds, and does not reuse the expensive hydrogen fluoride. Economic problems thus remain.

The present invention is aimed at solving the problems in the art as described above. It is therefore an object of the invention to provide efficient, simple and inexpensive processes for the production of carbonyl difluoride ($COF_2$), which is an attractive and important compound as a semiconductor etching gas or a semiconductor cleaning gas.

Solution to Problem

The present inventors studied the vapor-liquid equilibrium (an x-y diagram) of carbonyl difluoride and hydrogen chloride. It has been found that carbonyl difluoride and hydrogen chloride form an azeotropic or pseudo-azeotropic mixture. In the mixture, boiling point curves of these component are close each other. When the mixture is azeotropic and has a relative volatility approximate to 1, separating carbonyl difluoride and hydrogen chloride from such mixture is very difficult by usual distillation procedures (distillation columns) because the mixture is an azeotropic mixture as described above.

The present inventors have then studied diligently and have found that the addition of a solvent (an entrainer) to a mixture containing carbonyl difluoride and hydrogen chloride changes the relative volatility of the mixture and shifts the vapor-liquid equilibrium from the original relation, and consequently carbonyl difluoride and hydrogen chloride can be efficiently separated from the mixture containing carbonyl difluoride and hydrogen chloride by azeotropic distillation or extractive distillation.

The present inventors have then developed a process wherein phosgene and hydrogen fluoride are reacted in a gas phase in the presence of a fluorination catalyst to produce carbonyl difluoride and hydrogen chloride, and the mixture of carbonyl difluoride and hydrogen chloride having very similar boiling points is mixed with an organic solvent that is azeotropic with hydrogen chloride but zeotropic with carbonyl difluoride, and they are distilled to separate carbonyl difluoride. The present invention has been completed based on the finding.

The present invention is concerned with the following [1] to [13].

[1] A process for producing carbonyl difluoride comprising a step of reacting phosgene and hydrogen fluoride in a gas phase in the presence of a fluorination catalyst to produce carbonyl difluoride and hydrogen chloride, and a step of mixing a mixture comprising the carbonyl difluoride and the hydrogen chloride with an organic solvent that is azeotropic with hydrogen chloride but zeotropic with carbonyl difluoride, and distilling the resultant mixture to separate the carbonyl difluoride.

[2] The process for producing carbonyl difluoride described in [1], which comprises the following steps (1) to (3):

Step (1): a step of reacting phosgene and hydrogen fluoride in a gas phase in the presence of a fluorination catalyst to produce a mixture A comprising carbonyl difluoride and hydrogen chloride;

Step (2): a step of mixing the mixture A with an organic solvent that is azeotropic with hydrogen chloride but zeotropic with carbonyl difluoride, thereby preparing a mixture B; and Step (3): a step of distilling the mixture B to separate the carbonyl difluoride.

[3] The process for producing carbonyl difluoride described in [1], which comprises the following steps (1') to (3'):

Step (1'): a step of reacting phosgene and hydrogen fluoride in a gas phase in the presence of a fluorination catalyst to produce a mixture A comprising carbonyl difluoride and hydrogen chloride, and distilling the mixture A to produce a mixture A' comprising carbonyl difluoride and hydrogen chloride;

Step (2'): a step of mixing the mixture A' with an organic solvent that is azeotropic with hydrogen chloride but zeotropic with carbonyl difluoride, thereby preparing a mixture B'; and Step (3'): a step of distilling the mixture B' to separate the carbonyl difluoride.

[4] The process for producing carbonyl difluoride described in any one of [1] to [3], wherein the organic solvent is at least one selected from the group consisting of ethers, hydrofluorocarbons and perfluorocarbons.

[5] The process for producing carbonyl difluoride described in [4], wherein the ether is dimethyl ether.

[6] The process for producing carbonyl difluoride described in [4], wherein the hydrofluorocarbon is at least one selected from fluoromethane, trifluoromethane and pentafluoroethane.

[7] The process for producing carbonyl difluoride described in [4], wherein the perfluorocarbon is hexafluoroethane.

[8] The process for producing carbonyl difluoride described in any one of [1] to [3], wherein the fluorination catalyst is a supported catalyst or a bulk catalyst that comprises a catalyst component containing at least one element selected from the group consisting of In, Zn, Ni, Co, Mg, Cr, Cu, Mn, V, Fe and Bi.

[9] The process for producing carbonyl difluoride described in [8], wherein the fluorination catalyst is a supported catalyst which is supported on active alumina, and the active alumina has the following properties (1) to (5):

(1) the active alumina has a central pore diameter of 50 to 400 Å;

(2) not less than 70% of the pores in the active alumina are distributed within ±50% the central diameter;

(3) the pores in the active alumina have a pore volume in the range of 0.5 to 1.6 ml/g;

(4) the active alumina has a purity of not less than 99.9% by mass;

(5) the active alumina has a sodium content of not more than 100 ppm by mass.

[10] The process for producing carbonyl difluoride described in [8], wherein the fluorination catalyst is a supported catalyst which is supported on active carbon.

[11] The process for producing carbonyl difluoride described in any one of [1] to [3], which further comprises a step (4) of bringing the carbonyl difluoride produced into contact with a zeolite.

[12] The process for producing carbonyl difluoride described in [11], wherein the zeolite is at least one selected from the group consisting of Molecular Sieves 3A, Molecular Sieves 4A and Molecular Sieves 5A.

[13] An azeotropic mixture comprising hydrogen chloride, carbonyl difluoride, and an organic solvent that is azeotropic with hydrogen chloride but zeotropic with carbonyl difluoride.

Advantageous Effects of Invention

According to the production processes of the present invention, the target carbonyl difluoride ($COF_2$) may be produced efficiently, simply and inexpensively.

DESCRIPTION OF EMBODIMENTS

The processes for producing carbonyl difluoride of the present invention will be described in detail hereinbelow. The processes for producing carbonyl difluoride include a step of reacting phosgene and hydrogen fluoride in a gas phase in the presence of a fluorination catalyst to produce carbonyl difluoride and hydrogen chloride, and a step of mixing a mixture containing the carbonyl difluoride and the hydrogen chloride with an organic solvent that is azeotropic with hydrogen chloride but zeotropic with carbonyl difluoride, and distilling the resultant mixture to separate the carbonyl difluoride. For example, the process includes the following steps (1) to (3), or the steps (1') to (3').

1. Step (1)

In the step (1), phosgene and hydrogen fluoride (HF) are reacted in a gas phase in the presence of a fluorination catalyst to produce a mixture A including carbonyl difluoride and hydrogen chloride. The reaction of phosgene and hydrogen fluoride to give carbonyl difluoride and hydrogen chloride is represented by the following chemical reaction formula:

$$COCl_2 + 2HF \rightarrow COF_2 + 2HCl \tag{1}$$

The starting material phosgene ($COCl_2$) may be prepared by, for example, reacting chlorine and carbon monoxide in the presence of a metal halide as a catalyst as disclosed in JP-A-2002-542137.

(1) Fluorination Catalysts

Phosgene and hydrogen fluoride can be reacted in a gas phase by the use of a fluorination catalyst.

The fluorination catalyst preferably includes a catalyst component containing at least one element selected from the group consisting of In, Zn, Ni, Co, Mg, Cr, Cu, Mn, V, Fe and Bi. Preferred catalyst components containing these elements are, for example, metal fluorides and metal halides.

The fluorination catalyst may be a supported catalyst or a bulk catalyst, and preferably a supported catalyst.

When the fluorination catalyst is a supported catalyst, the carrier supporting the catalyst component is preferably active carbon or active alumina.

When the fluorination catalyst uses active carbon as the carrier, commercially available active carbon may be appropriately selected. In view of the fact that carbonyl difluoride is very susceptible to hydrolysis, it is preferable to select active carbon which contains as little water or as few hydroxyl groups as possible.

An exemplary production of a fluorination catalyst supported on active carbon as a carrier will be described. Active carbon is impregnated with an aqueous chromium chloride solution to permit the active carbon to adsorb the aqueous chromium chloride solution. The active carbon to which the aqueous chromium chloride solution is adsorbed is thereafter dried and calcined under a stream of nitrogen. The thus-prepared fluorination catalyst is preferably activated by treatments such as hydrogen fluoride treatment at a stage preceding the reaction.

A fluorination catalyst supported on active alumina as a carrier may be manufactured by usual methods, for example as follows. Active alumina is impregnated with an aqueous chromium chloride solution to permit the active alumina to adsorb the aqueous chromium chloride solution. The active alumina to which the aqueous chromium chloride solution is adsorbed is thereafter dried and calcined under a stream of air. The thus-prepared fluorination catalyst is preferably activated by treatments such as hydrogen fluoride treatment at a stage preceding the reaction, similarly to the catalyst supported on active carbon.

Preferably, the active alumina used as a carrier satisfies the following requirements (1) to (5):

(1) The active alumina has a central pore diameter of 50 to 400 Å.

(2) Not less than 70% of the pores in the active alumina are distributed within ±50% the central diameter.

(3) The pores in the active alumina have a pore volume in the range of 0.5 to 1.6 ml/g.

(4) The active alumina has a purity of not less than 99.9% by mass.

(5) The active alumina has a sodium content of not more than 100 ppm by mass.

The central pore diameter of the active alumina may be measured with a 50000 psi Hg-porosimeter capable of measuring pore diameters of 35 Å to 177 μm. The central pore diameter is preferably 50 to 400 Å. Active alumina with a central pore diameter of less than 50 Å is hardly producible on the industrial scale, and the use thereof as a catalyst carrier does not provide sufficient activity and the catalyst life is unreliable. Active alumina having a central pore diameter exceeding 400 Å A tends to fail to provide sufficient catalytic activity when used as a catalyst carrier.

Methods such as a sol-gel/oil dropping method (similar to the method (e) described later) can control chemical properties of spherical sol particles or can change sol-gel chemical operations. According to such methods, the bulk density, specific surface area, pore volume, pore diameter and pore distribution of the obtainable active alumina may be controlled as desired.

When the catalysts contain sodium and silicon in the form of oxides, the reaction producing carbonyl difluoride is inhibited by the formation of silicon fluoride by activity inhibitors or anhydrous hydrofluoric acid, or by accelerated isomerization reaction or disproportionation reaction. In view of this, the sodium content in the active aluminas is preferably not more than 100 ppm by mass, and more preferably as small as possible. The silicon content is preferably less than 300 ppm by mass, and more preferably as small as possible. The purity of the active aluminas is preferably not less than 99.9% by mass.

Examples of the active aluminas include boehmite and pseudoboehmite that have a substantial proportion of non-crystalline (amorphous) parts with little crystallinity according to X-ray diffractometry, and calcined forms thereof, i.e., intermediate aluminas such as κ, θ, δ, η, χ and ρ.

γ-Alumina or η-alumina is commonly used as a carrier for fluorination catalysts. When active alumina contains both γ-phase and η-phase, such active alumina is referred to as γ/η alumina. The alumina in the γ-phase and that in the η-phase of the γ/η alumina cannot be distinguished even by X-ray diffractometry.

Active alumina is usually produced by thermal decomposition of alumina hydrate, in detail by heating alumina hydrate under controlled conditions to remove a substantial proportion of water contained in the alumina hydrate.

Active aluminas are producible from raw materials such as alumina hydrates, aluminum hydroxides, aluminum hydroxide hydrates, aluminum salts, alkali aluminates, aluminum alkoxides and metallic aluminum. Exemplary industrial methods for producing active aluminas from these raw materials include the following methods (a) to (i):

(a) Alumina hydrate ($Al_2O_3 \cdot H_2O$ or AlOOH) contained in natural ores such as gibbsite, boehmite and diaspore is thermally dehydrated.

(b) Alumina hydrate (gel) obtained from the reaction of an aqueous sodium aluminate solution and an aqueous aluminum sulfate solution is dehydrated.

(c) Alumina hydrate (gel) obtained from the reaction of an aqueous sodium aluminate solution and carbon dioxide gas ($CO_2$) is dehydrated.

(d) Alumina hydrate (gel) obtained from the reaction of sodium aluminate powder and sulfur dioxide is dehydrated.

(e) An aqueous solution containing any of ammonia, an alkali metal hydroxide and a carbonate is added to an aqueous solution of an aluminum salt (for example, aluminum sulfate, aluminum nitrate or aluminum chloride), and the resultant alumina hydrate is dehydrated.

(f) Urea is added to an aluminum salt (for example, aluminum sulfate, aluminum nitrate or aluminum chloride) followed by heating, and the resultant alumina hydrate (a homogeneous precipitation method) is dehydrated.

(g) A carbonate is added to aluminum sulfate to produce basic aluminum sulfate (an alumina hydrosol), and the resultant alumina hydrosol is dehydrated.

(h) An aluminum salt is thermally decomposed.

(i) Aluminum isopropoxide is thermally decomposed.

Alumina hydrate that is a material for the active alumina may be obtained from gibbsite, boehmite or diaspore, or may be produced by a Bayer process in which alumina hydrate is produced from bauxite.

Other than the Bayer process, alumina hydrate may also be manufactured by, for example, a process in which alumina hydrate is produced from an alumina gel. In such processes, the obtainable alumina hydrate is a single alumina hydrate or a mixture of several kinds of alumina hydrates depending on conditions such as temperature, pH, time and concentration of raw materials. The alumina hydrates in the mixture are decomposed into respective and different alumina phases, with changes in pore structures, specific surface areas and properties of the aluminas.

Active alumina obtained by thermally treating alumina trihydrate from the Bayer process is preferable in terms of easy availability.

For example, the thermal treatment of alumina trihydrate may be performed by heating gibbsite containing alumina trihydrate at approximately 400° C. in an air stream. The thermal treatment dehydrates the alumina trihydrate to active alumina.

According to X-ray diffractometry, such active alumina is γ/η-alumina containing a small amount of boehmite, and typically has the following characteristics. It is difficult that the $Na_2O$ content in the active alumina prepared by this process be reduced to 0.05% or less.

The specific surface area is approximately 250 $m^2$/g.

The pore diameters measured with a 50000 psi (capable of measuring pore diameters of 35 Å to 177 μm) Hg-porosimeter have abroad pore distribution from 35 Å to 10 μm. The alumina also has a large number of small pores with a pore diameter of less than 35 Å.

The small pores with a pore diameter of less than 35 Å A are holes in the shape of circular cylinder, sphere or the like.

The active alumina contains as trace components approximately 0.9% by mass of $Na_2O$ and several hundred ppm by mass of $SiO_2$ and $Fe_2O_3$.

Alternatively, active alumina may be obtained by rapidly activating alumina hydrate from the Bayer process, for example by thermally treating it at 400 to 800° C.

The formation of boehmite and the formation of decomposition products drastically decrease during the thermal treatment, and the consequent active alumina has a weak γ/η-alumina pattern and is nearly amorphous. Further, aggregating or rehydrating the alumina results in active alumina that has a variety of forms such as spheres. This active alumina has smaller crystal lattices and smaller pore diameters than the active alumina before the aggregation or rehydration. The specific surface area of the active alumina is 300 to 350 $m^2$/g.

When an alumina gel is used as a starting material (the methods (b) to (d)), X-ray diffractometry of an alumina cake prepared by washing the alumina gel precipitate with water and draining it completely shows that the alumina cake contains pseudoboehmite alumina. In the industry, the cake may be dried, crushed and extruded into a cylindrical form or may be spray dried into spherical fine particles with approximately 50 Å diameters which are then shaped into spheres or pellets, and the shaped cake may be activated by thermal treatment to give active alumina. According to X-ray diffractometry, this active alumina contains γ/η-alumina which is nearly amorphous and also contains a small amount of $SiO_2$ as a trace component. Although the alumina gels produced in the methods described hereinabove have various structures, the alumina gels have a specific surface area of 300 to 600 $m^2$/g and a large number of pores.

The active aluminas typically have the following characteristics.

The pore volume is 0.3 to 0.8 ml/g.

The specific surface area is 150 to 350 $m^2$/g.

The average pore diameter is approximately 40 to 150 Å.

Pores with a diameter of 40 to 500 Å are approximately 20% in the pore size distribution of the active alumina.

A method similar to the method (g) is also preferable in which a trialkyl alumina is decomposed into aluminum hydrate, and the alumina hydrate is calcined to give active alumina, γ-alumina. The γ-alumina is shaped into pellets by pressing or extrusion. This active alumina has higher purity and narrower pore distribution with uniform pore diameters compared to naturally occurring alumina.

As the carriers for the fluorination catalysts, commercially available active aluminas may be selected appropriately in which the central pore diameter is 50 to 400 Å, not less than 70% of the pores are distributed within ±50% the central diameter, and the pore volume is in the range of 0.5 to 1.6 ml/g.

In view of easy handling when the fluorination catalyst is packed in or removed from the reactor, a preferred carrier is active alumina having a maximum diameter of not more than 20 mm, and more preferably approximately several mm. For the similar reasons, the shapes of the active alumina are preferably particles, beads or extruded products.

(2) Reaction Conditions

When the catalyst is a supported catalyst that is supported on the active alumina or active carbon, the reaction temperature in the step (1) is preferably 100 to 350° C., and more preferably 130 to 250° C. Temperatures below this range tend to lower the reaction rate of phosgene. Temperatures in excess of the above range tend to induce side reactions (in particular, by-production of carbon dioxide) or lower the catalyst activity.

The supply amount of hydrogen fluoride per unit time is preferably not less than 2 mol per 1 mol of phosgene. With this molar ratio, the reaction will take place smoothly.

2. Step (2)

In the step (2), the mixture A is mixed with an organic solvent that is azeotropic with hydrogen chloride but zeotropic with carbonyl difluoride, thereby preparing a mixture B.

From the viewpoint that hydrogen chloride and carbonyl difluoride contained in the mixture gas A can be mixed with the organic solvent uniformly and efficiently, it is preferable that the mixture (A) is formed in the form of gas in the step (1) and the gaseous mixture (A) is liquefied, and the liquid mixture (A) and the organic solvent are mixed together in the step (2) to give a liquid mixture (B).

For example, the gaseous mixture (A) may be liquefied by cooling the gaseous mixture (A) with conventional means and thereby liquefying the gaseous mixture (A).

The organic solvent that is azeotropic with hydrogen chloride but zeotropic with carbonyl difluoride is preferably at least one selected from the group consisting of ethers, hydrofluorocarbons and perfluorocarbons.

For example, the ether is preferably dimethyl ether.

For example, the hydrofluorocarbons are preferably fluoromethane, trifluoromethane and pentafluoroethane.

For example, the perfluorocarbon is preferably hexafluoroethane.

For example, a measurement of vapor-liquid equilibrium with an Othmer still shows that dimethyl ether as the organic solvent does not have an azeotropic relation with carbonyl difluoride. In this case, carbonyl difluoride and dimethyl ether can be separated from each other in all the fractions.

On the other hand, the vapor-liquid equilibrium of a hydrogen chloride/dimethyl ether mixture determined with an Othmer still shows that they have the highest azeotropic point at a mixing ratio of dimethyl ether (mass)/hydrogen chloride (mass)=56/44. The relation in which carbonyl difluoride and dimethyl ether are zeotropic while hydrogen chloride and dimethyl ether are azeotropic makes it possible to separate carbonyl difluoride and hydrogen chloride by azeotropic distillation and extractive distillation from the mixture containing carbonyl difluoride and hydrogen chloride obtained in the step (1).

Similarly, a measurement of vapor-liquid equilibrium with an Othmer still shows that hexafluoroethane as the organic solvent does not have an azeotropic relation with carbonyl difluoride. Thus, carbonyl difluoride and hexafluoroethane can be separated from each other in all the fractions.

On the other hand, the vapor-liquid equilibrium of a hydrogen chloride/hexafluoroethane mixture determined with an Othmer still shows that they have the lowest azeotropic point at a mixing ratio of hexafluoroethane (mass)/hydrogen chloride (mass)=68/32. The relation in which carbonyl difluoride and hexafluoroethane are zeotropic while hydrogen chloride and hexafluoroethane are azeotropic makes it possible to separate hydrogen chloride and hexafluoroethane by azeotropic distillation and extractive distillation as described later.

3. Step (3)

In the step (3), the mixture B prepared in the step (2) is distilled to separate the carbonyl difluoride.

The carbonyl difluoride may be separated from the mixture B by known distillation means. By distillation, the carbonyl difluoride is separated from the mixture B.

For example, the target carbonyl difluoride may be separated from the liquid mixture B by distillation in which the mixture B from the step (2) is introduced into a first distillation column to separate the carbonyl difluoride as a low-boiling fraction at the top of the column, and the hydrogen chloride/dimethyl ether azeotropic mixture and hydrogen fluoride as high-boiling fractions at the bottom of the column.

The hydrogen chloride/dimethyl ether azeotropic mixture and hydrogen fluoride are then withdrawn from the bottom of the first distillation column and are introduced to a second distillation column, where the azeotropic mixture and hydrogen fluoride are separated from each other.

In a preferred embodiment, an aqueous alkaline solution, water or the like may be added to the azeotropic mixture discharged from the second distillation column to separate dimethyl ether and hydrogen chloride from the mixture, and the dimethyl ether may be recovered and further separated by dehydration or the like and may be recycled to the reaction system.

4. Steps (1'), (2') and (3')

The step (1') includes the step (1) and a subsequent step wherein the mixture (A) is distilled to produce a mixture A' containing carbonyl difluoride and hydrogen chloride. In this step, the mixture A is produced and introduced into a first distillation column, and thereby a mixture A' as a low-boiling fraction which contains the hydrogen chloride/carbonyl difluoride azeotropic mixture is withdrawn from the top of the column, and hydrogen fluoride as a high-boiling fraction is discharged from the bottom of the column.

In the step (2'), the mixture A' is mixed with an organic solvent that is azeotropic with hydrogen chloride but zeotropic with carbonyl difluoride, thereby preparing a mixture B'. In the step (2'), the mixture A' withdrawn in the step (1') is mixed with an organic solvent that is azeotropic with hydrogen chloride but zeotropic with carbonyl difluoride to give a mixture B'. The organic solvents that are azeotropic with hydrogen chloride but zeotropic with carbonyl difluoride are similar to those described in the step (2), with dimethyl ether selected for the description herein. Similarly to the mixture B, the mixture B' may be preferably prepared by liquefying the mixture A' and mixing it with dimethyl ether.

In the step (3'), the mixture B' is distilled to separate the carbonyl difluoride. In the step (3'), the mixture B' is introduced into a second distillation column, and the carbonyl difluoride is withdrawn from the top of the column and the hydrogen chloride/dimethyl ether azeotropic mixture is discharged from the bottom of the column.

Performing the steps (1'), (2') and (3') instead of the steps (1), (2) and (3) achieves the same effects as obtained by the steps (1), (2) and (3). The conditions such as distillation means and mixing means used in the steps (1'), (2') and (3') are as described in the steps (1), (2) and (3).

5. Step (4)

The processes of the invention preferably include a step (4) in which the carbonyl difluoride separated in the step (3) or the step (3') is brought into contact with zeolite. By performing the step (4), water or the like may be removed from the carbonyl difluoride separated in the step (3). The temperature in the step (4) is preferably not more than room temperature, and preferably for example −20 to 30° C.

The zeolite is preferably at least one selected from the group consisting of Molecular Sieves 3A, Molecular Sieves 4A and Molecular Sieves 5A.

EXAMPLES

The processes for producing carbonyl difluoride of the present invention will be described in detail by presenting examples hereinbelow without limiting the scope of the invention.

[Preparation of Fluorination Catalysts]

[Catalyst 1]

Chromium chloride ($CrCl_3.6H_2O$) weighing 8.2 g was dissolved in 52 ml of pure water to give a catalyst liquid. In the catalyst liquid, 100 ml of a spherical, high-purity active alumina (NST-3 manufactured by NIKKI-UNIVERSAL CO., LTD.) having the following properties was soaked to permit the alumina to absorb all the catalyst liquid.

The alumina that had absorbed the catalyst liquid was dried to dryness over a hot water bath at 90° C., and was thereafter dried in a hot air circulation dryer at 110° C. for 10 hours to give a dry catalyst. The dry catalyst was packed into a glass calcination tube. The catalyst was calcined at an elevated temperature of 400° C. for 8 hours while passing air at a superficial velocity ($SV_0$) of 500 $Hr^{-1}$, thereby producing a catalyst 1.

(Properties of Spherical High-Purity Active Alumina)

Particle diameter: 3.2 mm

Preparation method: sol-gel/oil dropping method

Central pore diameter: 300 Å

Pore distribution: 79.8% of the pores were distributed in 163 to 444 Å.

Pore volume: 1.3 ml/g

Purity: 99.93% by mass (sodium content: 10 ppm by mass)

[Catalyst 2]

A catalyst 2 was prepared in the same manner as for the catalyst 1, except that cobalt chloride ($CoCl_2$) weighing 0.8 g was dissolved in 55 ml of pure water to give a catalyst liquid.

Synthetic Example 1

Inconel® 600 reactor having an inner diameter of 1 inch and a length of 1 m was loaded with 40 ml of the catalyst 1.

Prior to the synthesis reaction for carbonyl difluoride described later, the catalyst 1 was partially fluorinated under the following conditions using nitrogen-diluted hydrogen fluoride gas and 100% by volume hydrogen fluoride. The catalyst 1 was thereby activated to an active catalyst 1.

[Partial Fluorination Conditions]

Hydrogen fluoride concentration: 25-100% by volume

Treatment temperature: 150-350° C.

Treatment time: approximately 10 hours

The active catalyst 1 was placed in a reactor, and the temperature was maintained at 150° C. while flowing nitrogen gas. The supply of nitrogen gas was discontinued while flowing hydrogen fluoride at 143 ml/min and phosgene at 57 ml/min, and a reaction was thereby initiated. After approximately 2 hours from the initiation of the reaction, the outlet gas (the mixture A) was collected while continuing the reaction. The mixture A was analyzed by FT-IR (cell: $CaF_2$). The results are shown below.

[FT-IR Analysis Results of Outlet Gas (Mixture A)]

| | |
|---|---|
| $COF_2$ | 92.4% by volume |
| COClF | 7.3% by volume |
| Unreacted phosgene | 0.29% by volume |
| $CO_2$ | 0.08% by volume |

Synthetic Example 2

Inconel® 600 reactor having an inner diameter of 1 inch and a length of 1 m was loaded with 50 ml of the catalyst 2.

Prior to the synthesis reaction for carbonyl difluoride described later, the catalyst 2 was partially fluorinated under the following conditions using nitrogen-diluted hydrogen fluoride gas and 100% by volume hydrogen fluoride gas. The catalyst 2 was thereby activated to an active catalyst 2.

[Partial Fluorination Conditions]
  Hydrogen fluoride concentration: 25-100% by volume
  Treatment temperature: 150-350° C.
  Treatment time: approximately 10 hours The active catalyst 2 was placed in a reactor, and the temperature was maintained at 165° C. while flowing nitrogen gas. The supply of nitrogen gas was discontinued while flowing hydrogen fluoride gas at 162 ml/min and phosgene at 57 ml/min, and a reaction was thereby initiated. After approximately 4 hours from the initiation of the reaction, the outlet gas (the mixture A) containing carbonyl difluoride and by-products was collected while continuing the reaction. The mixture A was analyzed by FT-IR (cell: $CaF_2$). The results are shown below.

[FT-IR Analysis Results of Outlet Gas (Mixture A)]

| | |
|---|---|
| $COF_2$: | 99.51% by volume |
| COClF: | 0.3% by volume |
| $COCl_2$: | 0.09% by volume |
| $CO_2$: | 0.1% by volume |

The acid components were also analyzed, the results being shown below.

| | |
|---|---|
| Hydrogen chloride: | 112 ml/min |
| Unreacted hydrogen fluoride: | 49 ml/min |

Example 1

The mixture A obtained in Synthetic Example 2 was cooled and liquefied. Approximately 200 g of the liquefied mixture A was placed in a SUS cylinder (500 ml volume). The composition of the liquefied mixture A was analyzed, the results being shown below.
  $COF_2$: 41.4% by mass
  HCl: 46.7% by mass
  HF: 11.9% by mass Next, a mixture B was prepared by adding 190 g of dimethyl ether to the liquefied mixture A. The mixture B was distilled and separated under the following conditions, and fractions obtained from the top of the distillation column were analyzed. The results are shown below.

(Distillation Conditions and Operations)
  Distillation scale: 380 g of the mixture B was supplied.
  Distillation column: packed column 16 mm×500 mm
  Packed substance: approximately 100 ml of HELI PACK No. 2 (manufactured by TO-TOKU Engineering Corporation)
  Number of theoretical stages: 15 stages
  Operation conditions
  Pressure: approximately 0.8 MPa
  Oil bath temperature: 36-45° C.
  Reflux ratio: 15
(Results of Analysis of Column Top Fractions)
  $COF_2$: 98.8% by mass
  Other components: 1.2% by mass The other components were mainly oxygen, nitrogen and carbon dioxide ($CO_2$). As shown by the results of analysis of the column top fractions, $COF_2$ was obtained with high concentration by distilling the mixture B that was prepared by adding dimethyl ether to the mixture A.

Example 2

The mixture A obtained in Synthetic Example 2 was cooled and liquefied. Approximately 200 g of the liquefied mixture A was placed in a SUS cylinder (500 ml volume). The composition of the liquefied mixture A was analyzed, the results being shown below.
  $COF_2$: 41.5% by mass
  HCl: 46.6% by mass
  HF: 11.9% by mass The mixture A was distilled under the following conditions.

(Distillation Conditions and Operations)
  Distillation scale: 190 g of the mixture A was supplied.
  Distillation column: packed column 16 mm×500 mm
  Packed substance: approximately 100 ml of HELI PACK No. 2 (manufactured by TO-TOKU Engineering Corporation)
  Number of theoretical stages: 15 stages
  Pressure: approximately 0.8 MPa
  Oil bath temperature: 36-45° C.
  Reflux ratio: 15
(Results of Analysis of Column Top Fractions)
  $COF_2$: 46.94% by mass
  HCl: 52.91% by mass
  Others: 0.15% by mass The column top fractions were recovered as a mixture A' in an amount of 150 g. To the column top fractions, 160 g of dimethyl ether was added to prepare approximately 310 g of a mixture B'. The mixture was distilled and separated under the following conditions, and fractions obtained from the top of the distillation column were analyzed by FT-IR (cell: $CaF_2$). The results are shown below.

(Distillation Conditions and Operations)
  Distillation scale: approximately 310 g of the mixture B' was supplied.
  Distillation column: packed column 16 mm×500 mm
  Packed substance: approximately 100 ml of HELI PACK No. 2 (manufactured by TO-TOKU Engineering Corporation)
  Number of theoretical stages: 15 stages
  Operation conditions
  Pressure: approximately 0.8 MPa
  Oil bath temperature: 36-45° C.

(Results of Analysis of Column Top Fractions)
    $COF_2$: 99.2% by volume
    Other components: 0.8% by volume
The other components were mainly oxygen, nitrogen and carbon dioxide ($CO_2$). As shown by the results of analysis of the column top fractions, $COF_2$ was obtained with high concentration by distilling the mixture B' that was prepared by adding dimethyl ether to the mixture A'.

Example 3

The mixture A obtained in Synthetic Example 2 was cooled and liquefied. Approximately 200 g of the liquefied mixture A was placed in a SUS cylinder (500 ml volume). The composition of the liquefied mixture A was analyzed, the results being shown below.
    $COF_2$: 41.3% by mass
    HCl: 46.7% by mass
    HF: 12.0% by mass
The mixture A was distilled under the following conditions.
(Distillation Conditions and Operations)
    Distillation scale: 190 g of the mixture A was supplied.
    Distillation column: packed column 16 mm×500 mm
    Packed substance: approximately 100 ml of HELI PACK No. 2 (manufactured by TO-TOKU Engineering Corporation)
    Number of theoretical stages: 15 stages
    Pressure: approximately 0.8 MPa
    Oil bath temperature: 36-45° C.
    Reflux ratio: 15
(Results of Analysis of Column Top Fractions)
    $COF_2$: 46.96% by mass
    HCl: 52.90% by mass
    Others: 0.14% by mass
The column top fractions were recovered as a mixture A' in an amount of 140 g. To the column top fractions, 200 g of fluoromethane ($CH_3F$) was added to prepare approximately 340 g of a mixture B'. The mixture was distilled and separated under the following conditions, and fractions obtained from the top of the distillation column were analyzed by FT-IR (cell: $CaF_2$). The results are shown below.
(Distillation Conditions and Operations)
    Distillation scale: approximately 330 g of the mixture B' was supplied.
    Distillation column: packed column 16 mm×500 mm
    Packed substance: approximately 100 ml of HELI PACK No. 2 (manufactured by TO-TOKU Engineering Corporation)
    Number of theoretical stages: 15 stages
    Pressure: approximately 0.8 MPa
    Oil bath temperature: 31-42° C.
(Results of Analysis of Column Top Fractions)
    $COF_2$: 99.1% by volume
    Other components: 0.9% by volume
The other components were mainly oxygen, nitrogen and carbon dioxide ($CO_2$). As shown by the results of analysis of the column top fractions, $COF_2$ was obtained with high concentration by distilling the mixture B' that was prepared by adding fluoromethane to the mixture A'.

Comparative Example 1

The mixture A obtained in Synthetic Example 2 was cooled and liquefied. Approximately 180 g of the liquefied mixture A was placed in a SUS cylinder (500 ml volume). The composition of the liquefied mixture A was analyzed, the results being shown below.
    $COF_2$: 41.4% by mass
    HCl: 46.5% by mass
    HF: 12.1% by mass
The mixture A was distilled under the following conditions.
(Distillation Conditions and Operations)
    Distillation scale: 170 g of the mixture A was supplied.
    Distillation column: packed column 16 mm×500 mm
    Packed substance: approximately 100 ml of HELI PACK No. 2 (manufactured by TO-TOKU Engineering Corporation)
    Number of theoretical stages: 15 stages
    Oil bath temperature: 36-45° C.
    Reflux ratio: 15
(Results of Analysis of Column Top Fractions)
    $COF_2$: 46.93% by mass
    HCl: 52.92% by mass
    Others: 0.15% by mass
The column top fractions were recovered as a mixture A' in an amount of 120 g. To the column top fractions, 130 g of chloromethane ($CH_3Cl$) was added to prepare approximately 250 g of a mixture B'. The mixture was distilled and separated under the following conditions, and fractions obtained from the top of the distillation column were analyzed by FT-IR (cell: $CaF_2$). The results are shown below.
(Distillation Conditions and Operations)
    Distillation scale: approximately 250 g of the mixture B' was supplied.
    Distillation column: packed column 16 mm×500 mm
    Packed substance: approximately 100 ml of HELI PACK No. 2
    Number of theoretical stages: 15 stages
    Pressure: approximately 0.8 MPa
    Oil bath temperature: 36-45° C.
(Results of Analysis of Column Top Fractions)
    $COF_2$: 46.92% by mass
    HCl: 52.93% by mass
    Other components: 0.15% by mass
The other components were mainly oxygen, nitrogen and carbon dioxide ($CO_2$). The results of analysis of the column top fractions show that chloromethane had no azeotropic relation with hydrogen chloride or carbonyl difluoride and therefore the addition thereof to the mixture A' did not permit the distillation of the resultant mixture B' to $COF_2$ and HCl, resulting in a failure of the production of $COF_2$ with high concentration.

INDUSTRIAL APPLICABILITY

The separation of carbonyl difluoride has been very difficult by conventional separation methods such as distillation. However, according to the processes of the invention, carbonyl difluoride can be manufactured efficiently, simply and economically.

The invention claimed is:
1. A process for producing carbonyl difluoride comprising a step of reacting phosgene and hydrogen fluoride in a gas phase in the presence of a fluorination catalyst to produce carbonyl difluoride and hydrogen chloride, and a step of mixing a mixture comprising the carbonyl difluoride and the hydrogen chloride with an organic solvent that is azeotropic with hydrogen chloride but zeotropic with carbonyl difluoride, and distilling the resultant mixture to separate the carbonyl difluoride, wherein the organic solvent is at least one selected from the group consisting of ethers, hydrofluorocarbons and perfluorocarbons.

2. The process for producing carbonyl difluoride according to claim 1, which comprises the following steps (1) to (3):
   Step (1): a step of reacting phosgene and hydrogen fluoride in a gas phase in the presence of a fluorination catalyst to produce a mixture A comprising carbonyl difluoride and hydrogen chloride;
   Step (2): a step of mixing the mixture A with an organic solvent that is azeotropic with hydrogen chloride but zeotropic with carbonyl difluoride, thereby preparing a mixture B; and
   Step (3): a step of distilling the mixture B to separate the carbonyl difluoride.

3. The process for producing carbonyl difluoride according to claim 1, which comprises the following steps (1') to (3'):
   Step (1'): a step of reacting phosgene and hydrogen fluoride in a gas phase in the presence of a fluorination catalyst to produce a mixture A comprising carbonyl difluoride and hydrogen chloride, and distilling the mixture A to produce a mixture A' comprising carbonyl difluoride and hydrogen chloride;
   Step (2'): a step of mixing the mixture A' with an organic solvent that is azeotropic with hydrogen chloride but zeotropic with carbonyl difluoride, thereby preparing a mixture B'; and
   Step (3'): a step of distilling the mixture B' to separate the carbonyl difluoride.

4. The process for producing carbonyl difluoride according to claim 1, wherein the ether is dimethyl ether.

5. The process for producing carbonyl difluoride according to claim 1, wherein the hydrofluorocarbon is at least one selected from fluoromethane, trifluoromethane and pentafluoroethane.

6. The process for producing carbonyl difluoride according to claim 1, wherein the perfluorocarbon is hexafluoroethane.

7. The process for producing carbonyl difluoride according to claim 1, wherein the fluorination catalyst is a supported catalyst or a bulk catalyst that comprises a catalyst component containing at least one element selected from the group consisting of In, Zn, Ni, Co, Mg, Cr, Cu, Mn, V, Fe and Bi.

8. The process for producing carbonyl difluoride according to claim 7, wherein the fluorination catalyst is a supported catalyst which is supported on active alumina, and the active alumina has the following properties (1) to (5):
   (1) the active alumina has a central pore diameter of 50 to 400 Å;
   (2) not less than 70% of the pores in the active alumina are distributed within ±50% the central diameter;
   (3) the pores in the active alumina have a pore volume in the range of 0.5 to 1.6 ml/g;
   (4) the active alumina has a purity of not less than 99.9% by mass;
   (5) the active alumina has a sodium content of not more than 100 ppm by mass.

9. The process for producing carbonyl difluoride according to claim 7, wherein the fluorination catalyst is a supported catalyst which is supported on active carbon.

10. The process for producing carbonyl difluoride according to claim 2, which further comprises a step (4) of bringing the carbonyl difluoride produced into contact with a zeolite.

11. The process for producing carbonyl difluoride according to claim 10, wherein the zeolite is at least one selected from the group consisting of Molecular Sieves 3A, Molecular Sieves 4A and Molecular Sieves 5A.

12. An azeotropic mixture comprising hydrogen chloride, carbonyl difluoride, and an organic solvent that is azeotropic with hydrogen chloride but zeotropic with carbonyl difluoride, wherein the organic solvent is at least one selected from the group consisting of ethers, hydrofluorocarbons and perfluorocarbons.

13. The process for producing carbonyl difluoride according to claim 2, wherein the fluorination catalyst is a supported catalyst or a bulk catalyst that comprises a catalyst component containing at least one element selected from the group consisting of In, Zn, Ni, Co, Mg, Cr, Cu, Mn, V, Fe and Bi.

14. The process for producing carbonyl difluoride according to claim 3, wherein the fluorination catalyst is a supported catalyst or a bulk catalyst that comprises a catalyst component containing at least one element selected from the group consisting of In, Zn, Ni, Co, Mg, Cr, Cu, Mn, V, Fe and Bi.

* * * * *